(12) United States Patent
Ishihara et al.

(10) Patent No.: US 7,479,469 B2
(45) Date of Patent: Jan. 20, 2009

(54) ELECTRODE CATALYST FINE PARTICLES, DISPERSION OF THE SAME, AND PROCESS FOR PRODUCING THE DISPERSION

(75) Inventors: Yoichi Ishihara, Kitakyushu (JP); Toshiharu Hirai, Kitakyushu (JP); Michio Komatsu, Kitakyushu (JP)

(73) Assignee: JGC Catalysts and Chemicals Ltd. (JP)

( * ) Notice: Subject to any disclaimer, the term of this patent is extended or adjusted under 35 U.S.C. 154(b) by 0 days.

(21) Appl. No.: 10/966,895

(22) Filed: Oct. 15, 2004

(65) Prior Publication Data
US 2005/0085379 A1   Apr. 21, 2005

(30) Foreign Application Priority Data
Oct. 16, 2003   (JP) ............................. 2003-356437

(51) Int. Cl.
| | |
|---|---|
| *B01J 21/18* | (2006.01) |
| *B01J 23/40* | (2006.01) |
| *B01J 23/74* | (2006.01) |
| *B22F 1/00* | (2006.01) |
| *B22F 3/00* | (2006.01) |
| *C22C 29/02* | (2006.01) |
| *C22C 29/14* | (2006.01) |
| *H01M 4/00* | (2006.01) |

(52) U.S. Cl. ........................... 502/185; 75/228; 75/241; 75/243; 429/40; 429/42; 429/43; 429/44

(58) Field of Classification Search ................ 502/185; 75/228, 241, 243; 429/40–44
See application file for complete search history.

(56) References Cited

U.S. PATENT DOCUMENTS

| | | | | | |
|---|---|---|---|---|---|
| 2,881,511 | A | * | 4/1959 | Boegehold | ................... 75/243 |
| 4,028,274 | A | * | 6/1977 | Kunz | ........................... 502/184 |
| 4,054,687 | A | * | 10/1977 | Kunz | ........................... 427/115 |
| 4,186,110 | A | * | 1/1980 | Jalan et al. | .................. 502/101 |
| 4,316,944 | A | * | 2/1982 | Landsman et al. | ............ 429/44 |
| 4,454,246 | A | * | 6/1984 | Fung | ........................... 502/213 |
| 4,481,303 | A | * | 11/1984 | McIntyre et al. | ............ 502/159 |
| 4,569,924 | A | * | 2/1986 | Ozin et al. | .................. 502/184 |
| RE33,149 | E | * | 1/1990 | Petrow et al. | ................. 429/40 |
| 4,970,128 | A | * | 11/1990 | Itoh et al. | ..................... 429/42 |
| 5,695,622 | A | * | 12/1997 | Fraser et al. | ................. 204/292 |
| 6,007,934 | A | * | 12/1999 | Auer et al. | ..................... 429/44 |
| 6,649,300 | B2 | * | 11/2003 | Ito et al. | ......................... 429/44 |
| 6,861,387 | B2 | * | 3/2005 | Ruth et al. | .................. 502/184 |
| 2004/0087441 | A1 | * | 5/2004 | Bock et al. | .................. 502/313 |
| 2004/0259725 | A1 | * | 12/2004 | Chondroudis et al. | ........ 502/185 |
| 2005/0009696 | A1 | * | 1/2005 | Mao et al. | ..................... 502/325 |
| 2005/0058882 | A1 | * | 3/2005 | Meiklyar et al. | .............. 429/44 |
| 2005/0208365 | A1 | * | 9/2005 | Fetcenko et al. | .............. 429/40 |

\* cited by examiner

*Primary Examiner*—J. A. Lorengo
*Assistant Examiner*—Patricia L Hailey
(74) *Attorney, Agent, or Firm*—The Webb Law Firm

(57) ABSTRACT

Provided is a process for producing electrode catalyst fine particles capable of affording formed catalysts such as membranes excellent in uniformity and strength and also employable as catalyst to exhibit high catalytic activity over long periods because fine metal particles are highly distributed on carriers to make particle growth or the like less likely to occur. Electrode catalyst fine particles comprise fine particles which have an average particle diameter of 10 nm to 10 μm and in which fine metal particles are supported on carrier particles, wherein a potential difference (absolute value of (II) minus (I)) between a flow potential (I) of a water dispersion of the fine metal particles at 1 wt % concentration and a pH of 3 to 8 and a flow potential (II) of a water dispersion of the carrier particles at 1 wt % concentration and a pH of 4 to 10, is in the range of 10 to 3000 mV.

8 Claims, No Drawings

ELECTRODE CATALYST FINE PARTICLES, DISPERSION OF THE SAME, AND PROCESS FOR PRODUCING THE DISPERSION

FIELD OF THE INVENTION

The present invention relates to electrode catalyst fine particles for a fuel cell a dispersion of the electrode catalyst fine particles, and a process for producing the dispersion of the electrode catalyst fine particles.

More particularly, the invention pertains to electrode catalyst fine particles, a dispersion thereof, and a process for producing the dispersion, wherein the particles are capable of affording formed catalysts such as membranes excellent in uniformity and strength and are also employable as a catalyst to exhibit high catalytic activity over a long period of time because fine metal particles are highly distributed on carriers to make particle growth or the like less likely to occur.

BACKGROUND OF THE INVENTION

With the recent energy and environmental problems, fuel cells are of great interest as a highly efficient and nonpolluting generating system that can produce clean energy from hydrogen without emitting greenhouse gases such as $CO_2$. Currently, extensive studies and research are carried out for establishing use of the fuel cells in fixed facilities such as houses and business offices and mobile facilities such as automobiles.

The fuel cells are categorized by the types of electrolytes employed, such as, alkaline electrolyte type, solid polymer electrolyte type, phosphoric acid type, molten carbonate type and solid electrolyte type. In the solid polymer electrolyte fuel cells and the phosphoric acid fuel cells, protons are responsible for the charge transfer; therefore, these cells are also known as proton fuel cells.

Fuels for use in the above fuel cells include hydrocarbon fuels such as natural gas, LP gas, city gas, alcohols, gasoline, kerosene and gas oil.

The hydrocarbon fuel is converted to hydrogen and CO gases by reaction such as moisture reforming or partial oxidation, and the CO gas is eliminated to obtain the hydrogen gas. The hydrogen is supplied to anodes and dissociated by a metal catalyst into protons (hydrogen ions) and electrons. The electrons do their jobs as passing through circuits to cathodes, whilst the protons (hydrogen ions) are diffused through the electrolyte membrane to reach the cathodes. At the cathodes, the electrons, the hydrogen ions, and the oxygen supplied at the cathodes react to produce water, which is then diffused through the electrolyte membrane. That is, the fuel cells have a mechanism such that the electricity is obtained when the oxygen and the fuel-derived hydrogen are fed with formation of water.

As the cathodes for use in the above fuel cells, development is underway for those composed of porous substrates on which catalyst layers (membranes) of metal components such as Pt, Pt—Ni, Pt—Co and Pt—Cu are sputtered. The anodes now studied include those composed of porous substrates on which catalyst layers (membranes) of metal components such as Pt—Ru, Pt—Fe, Pt—Ni, Pt—Co and Pt—Mo are sputtered.

However, the sputtered catalyst layers often have a problem that the fine metal particles have non-uniform and large particle diameters and consequently provide a lower surface area, resulting in insufficient activity. Moreover, the sputtering devices are expensive to cause economic difficulties.

There are other known electrodes that are composed of porous carbon materials such as carbon paper and carbon cloth on which fine platinum particles or the like are supported. Such electrodes are obtained by adhering metal salts or metal hydroxides on carbon paper and heat-treating them under a reducing atmosphere.

However, the above method has a problem in that the fine metal particles aggregate or grow during the heat treatment, so that the particle diameters become nonuniform and are difficult to control within the desired range. In addition, the catalytic activity will deteriorate with time.

The present inventors examined an enablement of particulate carrier on which metal as a catalyst were supported instead of sheet or paper carriers. It is difficult to form a thin film of the fine metal particles uniformly on the carrier particle surfaces.

SUMMARY OF THE INVENTION

In light of the above problems, the present inventors carried out earnest studies. As a result, they have found that mixing a dispersion of fine metal particles precontrolled in diameter and configuration with a dispersion of carrier particles having a predetermined potential difference from the metal particle dispersion results in contact between the fine metal particles and the carrier particles in the dispersion mixture to yield fine catalyst particles in which the fine metal particles are fixed on the carrier particles and which are monodisperse in the dispersion mixture. The fine catalyst particles have been found capable of producing formed catalysts such as membrane electrodes that have superior strength. The present invention has been accomplished based on these findings.

That is, electrode catalyst fine particles according to the present invention comprise catalyst fine particles which have an average particle diameter of 10 nm to 10 μm and in which fine metal particles are supported on carrier particles, wherein a potential difference (absolute value of (II) minus (I)) between a flow potential (I) of a water dispersion of the fine metal particles at 1 wt % concentration and a pH of 3 to 8 and a flow potential (II) of a water dispersion of the carrier particles at 1 wt % concentration and a pH of 4 to 10, is in the range of 10 to 3000 mV.

Preferably, the fine metal particles comprise one or more metals selected from Au, Ag, Pd, Pt, Rh, Cu, Fe, Ni, Co, Sn, Ti, In, Al, Ta, Sb, Ru, Mo and Cr, and the carrier particles comprise carbon.

The fine metal particles preferably have an average particle diameter of 2 to 100 nm.

The fine metal particles may be fine metal chain particles resulting from chain wise linkage of two or more primary particles having an average primary particle diameter of 2 to 50 nm.

A dispersion of electrode catalyst fine particles according to the present invention comprises the above electrode catalyst fine particles and a dispersion medium in which the particles are dispersed.

The dispersion is preferably such that the electrode catalyst fine particles are dispersed in water at 1 wt % solid, concentration and a pH of 1 to 10 to provide a flow potential of −800 to −50 mV.

A process for producing a dispersion of electrode catalyst fine particles according to the present invention comprises mixing a dispersion of fine metal particles and a dispersion of carrier particles, the fine metal particles being dispersed in water at 1 wt % concentration and a pH of 3 to 8 to have a flow potential (I) and the carrier particles being dispersed in water at 1 wt % concentration and a pH of 4 to 10 to have a flow potential (II) such that the potential difference (absolute value of (II) minus (I)) between the flow potentials (I) and (II) is in the range of 10 to 3000 mV, and adjusting the pH of the dispersion mixture in the range of 2 to 10.

The invention can prevent aggregation or particle growth of fine metal particles as conventionally encountered when such particles are used as catalyst. This is achieved because fine metal particles appropriately precontrolled in size and configuration are supported on fine carrier particles. Accordingly, the activity may be maintained over long periods. Furthermore, the supported particles may be obtained without heating at high temperatures so that the resulting electrode catalyst fine particles are not aggregated, have excellent dispersibility, and give a formed catalyst such as a membrane having superior strength.

DETAILED DESCRIPTION OF THE INVENTION

Hereinbelow, the catalyst fine particles, the dispersion of the same, and the process for producing the dispersion according to the invention will be described.

Electrode Catalyst Fine Particles

The electrode catalyst fine particles of the invention have an average particle diameter of 10 nm to 10 μm and contain fine metal particles and carrier particles on which the fine metal particles are supported.

Fine Metal Particles

The fine metal particles for use in the invention are of one or more metals selected from Au, Ag, Pd, Pt, Rh, Cu, Fe, Ni, Co, Sn, Ti, In, Al, Ta, Sb, Ru, Mo and Cr, or a mixture thereof.

When the fine metal particles include two or more kinds of metals, they may be an alloy in the form of solid solution, a eutectic crystal not in the form of solid solution, or a mixture of the alloy and the eutectic crystal. Such fine metal particles are often unlikely to grow and excellent in poisoning resistance, so that they can exhibit catalytic activity for a longer period of time.

In the case where the fine metal particles include two or more kinds of metals, preferred combinations of metals are, although not limited to and variable depending on the reaction, Au—Cu, Ag—Pt, Ag—Pd, Au—Pd, Au—Rh, Pt—Pd, Pt—Rh, Pt—Ru, Pt—Cu, Pt—W, Pt—Au, Pt—Fe, Pt—Ni, Pt—Co, Pt—Mo, Fe—Ni, Ni—Pd, Fe—Co, Cu—Co, Ru—Ag, Au—Cu—Ag, Ag—Cu—Pt, Ag—Cu—Pd, Ag—Au—Pd, Au—Rh—Pd, Ag—Pt—Pd, Ag—Pt—Rh, Fe—Ni—Pd, Fe—Co—Pd, Cu—Co—Pd, Pt—Pd—Cu, Pt—Cu—Ru, Pt—Cu—Fe, Pt—Ru—W, Pt—Ru—Mo and Pt—Ru—Ni.

The electrode catalyst fine particles of the present invention may be used for any of anodes and cathodes. Accordingly, the fine metal particles supported on the carrier particles are selected appropriately for desired purposes. For use in the anodes, Pt, Pt—Ru, Pt—Ru—Mo and Pt—Ru—Ni may be employed. For the cathodes, Pt, Pt—Fe, Pt—Cu, Pt—Ni, Pt—Pd and Pt—Co may be selected.

The fine metal particles may be monodisperse fine metal particles with an average particle diameter of 2 to 100 nm, and preferably 2 to 20 nm. Alternatively, they may be fine metal chain particles resulting from chainwise linkage of two or more primary particles having an average primary particle diameter of 2 to 50 nm.

In the case of the monodisperse fine metal particles, insufficient activity often results when the average particle diameter is too small, presumably due to lowered metallic properties. Furthermore, particle growth easily occurs and activity and selectivity may deteriorate with time. When the average particle diameter is too large, it is often difficult to support the fine metal particles stably since they are larger than the carrier particles. Further, the activity may be insufficient because the fine metal particles provide a lower specific surface area. The particle diameter ratio of the carrier particles and the fine metal particles (metal: carrier) is desirably in the range of 1:10 to 1:100, and preferably 1:20 to 1:50.

As used herein, the fine metal chain particles refer to fine metal particles that result from chainwise linkage of two or more primary particles having an average particle diameter of 2 to 50 nm. The metal chain particles preferably range in average length from 4 to 100 nm, and more preferably from 4 to 50 nm.

The fine metal chain particles with an average length of less than 4 nm are difficult to obtain. Those having an average length exceeding 100 nm are sometimes difficult to be supported stably on the carriers. Even if supported, the fine catalyst particles are prone to aggregate with the results of lowered dispersibility of the fine catalyst particles and deteriorated formability for use as formed catalysts.

Unlike the primary particles being in mutual contact by interparticle attraction, the fine metal chain particles link together by metallic bond. It is preferable that a component identical to or different from the primary particles attach to the particle joints called "necks" to enable the primary particles to link together by surfaces. Such consecutively linked fine metal chain particles may have a linear, zigzag, arcuate or ring shape. The metal chain particles when used as catalyst do not grow with time and they function as conductive paths. Therefore, the fine metal chain particles are suitable for reactions such as catalyzed reaction and electrode reaction that require conductivity.

For example, the fine metal particles used in the present invention may be obtained by the methods described below.

Monodisperse Fine Metal Particles (i) In water and/or an alcohol solvent, desired one or more metal salts are reduced simultaneously or separately to prepare a metal or metal hydroxide gel slurry with primary particle diameters from 2 to 100 nm. Where necessary, a reducing agent may be used in the above reduction. Examples of the reducing agents include ferrous sulfate, trisodium citrate, tartaric acid, sodium borohydride, hydrazine and sodium hypophosphite.

It is preferable that the fine metal particle dispersion is then purified by removing ionic impurities. There is particularly no limitation as to the method for removing the ionic impurities. For example, methods include treatments with cation, anion or amphoteric ion exchange resins. The concentration of the ionic impurities in the dispersion is preferably 1 wt % or below, and more preferably 0.1 wt % or below. When the ionic impurities concentration is not more than 1 wt %, the fine metal particles in the dispersion have high stability and are less likely to aggregate in the preparation of catalyst fine particles. Accordingly, the fine metal particles may be supported uniformly on the carrier particles.

Fine Metal Chain Particles (1) For example, conductive fine metal chain particles may be produced by the following method.

First, a metal salt is reduced in an alcohol/water mixed solvent to give a slurry dispersion of fine metal particles with primary particle diameters from 2 to 100 nm. In the above reduction, a reducing agent will be generally used. The reducing agents include ferrous sulfate, trisodium citrate, tartaric acid, sodium borohydride, hydrazine and sodium hypophosphite. When two or more kinds of metal salts are used, they may be reduced simultaneously or may be reduced separately and thereafter mixed together.

The slurry dispersion of the fine metal particles is preferably purified by removing ionic impurities. There is particularly no limitation as to the method for removing the ionic impurities. For example, methods include treatments with cation, anion or amphoteric ion exchange resins as required. The concentration of the ionic impurities is preferably such that the slurry dispersion has an ion concentration of 1000 ppm or below, although variable depending on the quantity of the conductive fine particles in the dispesion. The dispersion of the fine metal particles from which the ionic impurities have been removed sometimes forms a gel, and such a gel may be suitably employed in the invention. In the gel, the fine metal particles link like a chain because of the gel structure.

Subsequently, the slurry dispersion of the fine metal particles is subjected to mechanical dispersion treatment. By the mechanical dispersion treatment, the formed gel is defloccu-lated to obtain a sol in which the conductive fine chain particles are dispersed results. For example, mechanical dispersion treatments are by use of a sand mill or impact. In particular, impact dispersing methods are preferably employed The impact dispersing methods are dispersion or pulverization method causing a slurry to collide against a wall at high speeds such as close to the sound speed. Devices such as artimizers and nanomizers may be used to carry out such methods. These methods are preferable since a sol may be obtained in which the conductive fine chain particles are stably dispersed, without the outcomes that the linkages within the particles are broken to lead to amorphous particles and that the surface functional groups such as OH groups occur to lower the conductivity.

A stabilizer may be used in the mechanical dispersing treatment. Specific examples of the stabilizers include gelatins, polyvinyl alcohols, polyvinylpyrrolidones, polycarboxylic acids such as oxalic acid, malonic acid, succinic acid, glutaric acid, adipic acid, sebacic acid, maleic acid, fumaric acid, phthalic acid and citric acid, salts of these acids, heterocyclic compounds, and mixtures thereof. The stabilizer used in the preparation of the conductive fine particles may be the same as or different from that added in the coating described later. The stabilizer is desirably used in amounts of from 5 to 50%, and preferably 5 to 30% relative to CMC (critical micelle concentration) in the stabilizer.

When the stabilizer has a less than 5% proportion relative to CMC, the amount of the stabilizer found on the particle surfaces becomes insufficient to result in formation of non-chain particles that are three-dimensionally linked. When the amount of the stabilizer exceeds 50% relative to CMC, the conductive fine chain particles decrease and instead monodisperse particles increase. Since the conductive paths are hardly to be formed due to the decreased conductive fine chain particles, lowering in resistance of the conductive layer may not be achieved.

(2) Alternatively, conductive fine chain particles comprising metals may be produced by the following method.

First, a metal salt is reduced in an alcohol/water mixed solvent to prepare a slurry dispersion of the fine metal particles with primary particle diameters from 2 to 100 nm. In the above reduction, a reducing agent will be generally used. The reducing agents include the same ones as described above.

Subsequently, the slurry dispersion of the fine metal particles is heated under pressure in a pressure container or the like (hereinafter, this treatment will be referred to as autoclave treatment). This autoclave treatment will be generally carried out at temperatures of about 100 to 250° C. A stabilizer may be used in the treatment, and the kinds and amounts of the stabilizer are as described above. The yield of the conductive fine chain particles and the lengths thereof may be adjusted depending on whether the slurry dispersion of the fine metal particles is stirred or not during the treatment.

The autoclave treatment is then followed by the aforesaid mechanical dispersion treatment. Meanwhile, a metal salt may be additionally used in the autoclave treatment. The metal salt used herein may be the same as or different from that used in the preparation of the slurry dispersion of the fine metal particles. When the metal salt has been additionally used, the metal ions migrate to the necks during the heat treatment to alter the joints of particles from point-to-point contact to surface-to-surface contact, and the conductive fine chain particles having the "necks" may be obtained.

(3) Still further, conductive fine chain particles comprising metals may be produced by the following method.

First, a metal salt is reduced in an alcohol/water mixed solvent and in the presence of a reducing agent and an organic stabilizer. Examples of the reducing agents and organic stabilizers used herein include the same ones as described above. The organic stabilizer will be suitably used in an amount of 0.005 to 0.5 part by weight, and preferably 0.01 to 0.2 part by weight based on 1 part by weight of the fine metal particles to be formed. When the organic stabilizer has an amount less than 0.005 part by weight, sufficient dispersibility is not obtained. When the amount exceeds 0.5 part by weight, the conductive fine chain particles decrease and instead monodisperse particles increase. Furthermore, the presence of excess organic stabilizer may cause aggregated particles, and the residual organic stabilizer may inhibit the conductivity. This method also can produce conductive fine chain particles having the "necks".

The thus-prepared conductive fine chain particles are generally recovered from the dispersion by centrifugation or a like method, then optionally washed with an acid, and dispersed in a polar solvent as described later. The dispersion of the conductive chain fine particles may be used directly as a coating liquid.

Carrier Particles

Next, the carrier particles employed in the present invention will be described.

The carrier particles used in the invention are carbon particles. The carbon is suitable since it has a high specific surface area and is thus able to carry a large amount of the fine metal particles. The carrier particles preferably range in average particle diameter from about 10 nm to 10 μm, although variable depending on the sizes of the fine metal particles supported thereon.

The carbon particles employable in the invention include those having a specific surface area of about 50 to 2000 $m^2/g$, such as carbon blacks, fullerenes, activated carbons, carbon nanotubes and carbon fibers.

The fine metal particles to be supported and the carrier particles are each selected such that the absolute value of the difference between the flow potential (I) of dispersion of the fine metal particles and the flow potential (II) of dispersion of the carrier particles will be in the range of 10 to 3000 mV, and preferably 20 to 2000 mV. Herein, the flow potentials are measured using analyzer PCD-03pH (PCD is an abbreviation for particle charge density) available from MUTEK The measurement conditions are such that the fine metal particles and the carrier particles are each dispersed in water to achieve 1 wt % concentration and a predetermined pH. The liquid temperature at the measurement may be ambient, generally in the range of 20 to 30° C.

The particles differing from each other in flow potential have strong electrical interaction, which enables the fine metal particles to be supported firmly and uniformly on the carrier particles.

In particular, it is preferred that the fine metal particles have a negative flow potential and the carrier particles have a positive one. Such opposite potentials produce strong electrostatic attraction, and the particles can be firmly supported. Furthermore, this combination leads to a flow potential in the range of −800 to −50 mV as described later, and the electrode catalyst fine particles obtained have little aggregation.

The combinations of the carrier particles and the fine metal particles suitable in the invention include carbon black-Pt, carbon black-Pt/Ru, carbon black-Pt/Cu, carbon nanotube-Pt, carbon fiber-Pt and fullerene-Pt.

The fine metal particles supported on the carrier particles preferably account for 5 to 80 wt %, and more preferably 10 to 60 wt %, although variable depending on the diameters of the fine metal particles and the carrier particles.

When the fine metal particles are supported at less then 5 wt %, the active surface area thereof becomes small and the conductive paths are not formed adequately, resulting in insufficient electrode catalytic activity.

When the amount of the fine metal particles exceeds 80 wt %, difficulties are encountered when supporting them. Even if they are supported, the fine metal particles have too high a density and effectiveness tends to lower.

According to the present invention, electrode catalyst fine particles having a higher catalyst activity can be obtained. Moreover, since the metal fine particles are dispersed on the carrier particles, the metal fine particles are highly (homogeneously) dispersed in the electrode catalyst in comparison with the sheet carrying the metal particle.

Heretofore, it is considered that the metal fine particles supported on the carrier particle are partially exposed on surface to indicate catalyst activities.

In contrast, it is considered in the present invention that the metal fine particles are wholly exposed on the carrier particle since the metal fine particles are attracted to carrier particles by electrostatic attraction. Therefore, electrode catalyst fine particles have a high surface area and have a high contact area with proton conduction membrane. Further, the full surface of the metal fine particle is effectively functioned as the catalyst. Further, amount of the metal fine particles can be reduced to be economically competitive. Since a contact area between the metal fine particles and the carrier particles is smaller than the conventional catalyst as described above, the heat is easily diffused and radiated. As a result, the electrode catalyst fine particles of the present invention maintain the activity for a long time.

In particular, when the fine chain particles comprising metals are used, the fine metal particles are contacted each other, therefore an electron conduction as electrode is more smooth and efficient than mono particle. Furthermore, since the heat is more easily diffused and radiated, the activity for a long time is much further maintained.

Dispersion of Electrode Catalyst Fine Particles

The dispersion of electrode catalyst fine particles according to the present invention results from dispersing the aforesaid electrode catalyst fine particles in a dispersion medium.

The dispersion media include water; alcohols such as methanol, ethanol, n-propyl alcohol, i-propyl alcohol, butanol, diacetone alcohol, furfuryl alcohol, tetrahydrofurfuryl alcohol, ethylene glycol and hexylene glycol; esters such as methyl acetate and ethyl acetate; ethers such as diethyl ether, ethylene glycol monomethyl ether, ethylene glycol monoethyl ether, ethylene glycol monobutyl ether, diethylene glycol monomethyl ether, diethylene glycol monoethyl ether and isopropyl glycol; and ketones such as acetone, methyl ethyl ketone, acetyl acetone and acetoacetate. These may be used singly or in combination of two or more kinds.

In the dispersion, the concentration of the electrode catalyst fine particles is preferably in the range of 1 to 50 wt %, and more preferably 2 to 30 wt %.

When the particle concentration is low, membrane production from the dispersion causes economical problems since the dispersion applied one time can produce only a thin membrane, and therefore application, drying and other procedures must be carried out repeatedly in order to obtain a sufficiently thick membrane, leading to bad production efficiency.

When the particle concentration in the dispersion is too high, the electrode catalyst fine particles tend to aggregate. Consequently, the results are often that the membrane obtained has lower strength and becomes less dense, and cracks form.

The dispersion of the electrode catalyst fine particles, when controlled in solid concentration at 1 wt % and pH at 1 to 10, preferably has a flow potential of −800 to −50 mV, and more preferably −800 to −100 mV.

When the flow potential falls outside the above range, the electrode catalyst fine particles sometimes aggregate. If the flow potential is within the above range, the electrode catalyst fine particles will not aggregate and give a membrane excellent in uniformity, denseness and strength, even if the pH of the dispersion of the electrode catalyst fine particles is lowered by being mixed with, for example, a sulfonic acid polymer electrolyte to prepare the electrode catalyst.

Process for Producing Dispersion of Electrode Catalyst Fine Particles

In the process for producing a dispersion of catalyst fine particles according to the present invention, a dispersion of the aforesaid fine metal particles and a dispersion of the carrier particles are mixed in a desired ratio, and subsequently the pH is adjusted in the range of 2 to. 10.

Specifically, the fine metal particles are dispersed in water at 1 wt % concentration and the pH is adjusted to 3 to 8 to prepare a water dispersion having a flow potential (I). Similarly, the carrier particles are dispersed in water at 1 wt % concentration and the pH is adjusted to 4 to 10 to prepare a water dispersion having a flow potential (II). These two water dispersions have a relation that the potential difference (absolute value of (II) minus (I)) between the flow potentials (I) and (II) is in the range of 10 to 3000 mV, and preferably 20 to 2000 mV. In the present process, such dispersions of the fine metal particles and the carrier particles are mixed, and the pH of the dispersion mixture is adjusted to 2 to 10.

As the carrier particles and the fine metal particles, the present process may employ the same carrier particles and fine metal particles as described hereinabove.

In the process, the dispersions of the fine metal particles and the carrier particles are first mixed to give a dispersion mixture.

The mixing ratio of the dispersions of the fine metal particles and the carrier particles is such that the resultant catalyst fine particles will support the fine metal particles in the amount as described above.

The solid concentrations in the dispersions of the fine metal particles and the carrier particles are not particularly limited as long as they can be mixed together. However, the concentration of the fine metal particles and the carrier particles combined is desirably controlled beforehand in the range of 1 to 50 wt %, and preferably 2 to 30 wt %, in view of handling.

The solid concentration should fall in the above range in the final product. Therefore, the concentration may be lowered when too high by dilution and may be increased when too low by solvent volatilization during the production.

Subsequently, the pH of the dispersion mixture is adjusted to 2 to 10, and preferably 4 to 7.

When the pH is too low (strongly acidic), the adhesion or linkage of the fine metal particles to the carrier particles will be lowered and the fine metal particles supported may leach out. Furthermore, the surface potential is decreased and consequently the electrode catalyst fine particles may aggregate.

When the pH is too high (strongly alkaline), the adhesion or linkage of the fine metal particles to the carrier particles will be similarly lowered and the fine metal particles supported tend to be converted to hydroxides or oxides. Furthermore, the electrode catalyst performance may be insufficient.

The pH adjusters include general acids such as hydrochloric acid, nitric acid and sulfuric acid, and bases such as $NH_4OH$ and organic amines.

When pH adjusted the dispersion generally has ambient temperature, but may be heated according to necessity.

When the thus-obtained dispersion of the electrode catalyst fine particles is adjusted in solid concentration at 1 wt % and pH at 1 to 10, the flow potential thereof is preferably in the range of –800 to –50 mV, and more preferably –800 to –100 mV.

According to the invention as described hereinabove, the fine metal particles precontrolled in diameter and configuration are contacted in the dispersion with the carrier particles having a specific potential difference from the metal particles. The contact causes the fine metal particles to be supported on the carrier particles, thereby to yield catalyst fine particles that are monodisperse in the dispersion mixture. The catalyst fine particles are capable of producing formed catalysts such as membrane electrodes having superior strength.

When forming catalysts such as membrane electrodes, the coating liquid containing the above-described electrode catalyst fine particles is used. The coating liquid may contain a binder together with the electrode catalyst fine particles. As a binder, an inorganic binder and/or organic binder can be used. For example, organic silane compound such as alkoxy silane compounds or halogenated silane compound which may be hydrolyzed, ion exchange resin having ion conduction group such as sulfonic acid group (e.g. Nafion) or carboxylic acid group are used as binder. The coating liquid can be prepared by mixing the dispersion of the electrode catalyst fine particles with a binder solution.

The coating method of the coating liquid is not limited. For example, the coating liquid is applied onto an electrode substrate such as carbon or metal foil by a known coating method such as coater, roll coater, spin coater, spray and screen printing. Furthermore, the coating liquid may be spread on insoluble solvent, and then the obtained film may be transferred to the substrate. The coating liquid may be flow-casted to form a membrane electrode.

The formed catalyst used as a fuel cell electrode may provide a fuel cell with small energy loss. When using a proton permeable membrane, a membrane-electrode assembly can be prepared.

EXAMPLES

The present invention will be hereinafter described in greater detail by the Examples presented below, but it should be understood that the invention is in no way limited by or to those Examples.

Example 1

Preparation of Dispersion of Electrode Catalyst Fine Particles (1)

25 g of chloroplatinic hexahydrate (9 g in terms of Pt) was dissolved in 16000 g of pure water to form an aqueous metal salt solution. The solution was then combined with 1660 g of a 1.0 wt % trisodium citrate aqueous solution as complexing stabilizer and 140 g of a 0.1 wt % sodium borohydride aqueous solution as reducing agent. The mixture was stirred at 20° C. for 1 hour in a nitrogen atmosphere to give a dispersion of fine metal particles. Subsequently, the dispersion was purified by ultrafiltration membrane method and the filtrate was concentrated to prepare a dispersion of fine platinum particles having 1 wt % metal concentration. The dispersion pH was 6, the average particle diameter was 4 nm, and the flow potential was –130 mV.

Separately, 5 g of carbon black powder (trade name: Ketjen black EC, specific surface area: 800 $m^2/g$, average particle diameter: 400 nm (aggregated particle diameter)) was added to 495 g of pure water and mixed together by stirring. The resultant mixture was adjusted to pH 8 by addition of 1 wt % concentration hydrochloric acid. The thus-obtained carbon black dispersion had a flow potential of 900 mV.

The above-prepared carbon black dispersion was combined with 1000 g of the fine platinum particle dispersion (5 g in terms of platinum), and the pH of the dispersion mixture was adjusted to 6. In a nitrogen atmosphere, the dispersion mixture was stirred for 1 hour at 20° C. and thereby the fine platinum particles were supported on the carbon black particles. As a result, a dispersion of electrode catalyst fine particles was obtained. The dispersion was subjected to centrifugal separation to recover the particles. The separated particles were then dispersed in pure water, and the pH was adjusted to 6, thus obtaining a dispersion of electrode catalyst fine particles (1) having 10 wt % solid concentration. The electrode catalyst fine particles (1) were found to contain 50 wt % platinum. The average (secondary) particle diameter of the electrode catalyst fine particles (1) was 250 nm. When the dispersion was diluted to 1 wt % solid concentration, the flow potential was shown to be –400 mV.

Preparation of single cell fuel cell (1) 100 g of the 10 wt % dispersion of the electrode catalyst fine particles (1) was combined with 140 ml of butyl acetate. To the mixture, a 5 wt % polymer electrolyte solution (Nafion, available from Aldrich) was added to form a paste. Subsequently, the paste was applied to two pieces of carbon paper water-repellent treated with tetrafluoroethylene (product of Toray Industries, Inc.) so that each sheet would be coated with the platinum-supporting carbon particles at 0.50 $mg/cm^2$. The coating films were dried at 100° C. for 12 hours to yield two gas diffusion electrodes. These two diffusion electrodes were used as a cathode and an anode to interpose a solid polymer electrolyte membrane (perfluorocarbonsulfonic acid membrane Nafion-112, manufactured by Dupont, 40 μm membrane thickness). Thereafter, they were hot pressed at a press pressure of 50 MPa and a temperature of 150° C. for 30 seconds to bond the gas diffusion electrodes and the solid polymer electrolyte membranes. Thus, a single cell fuel cell (1) was prepared.

Evaluation

The single cell fuel cell (1) and a separator were installed in a single cell fuel cell evaluating device, and the device was placed in a thermo-hygrostat. Subsequently, the fuel electrode was supplied with 200 ml/min of a hydrogen gas (containing 100 ppm carbon monoxide) and the oxidizing electrode was supplied with 200 ml/min of air. The polarization value was measured for the single cell at atmospheric pressure, 80% humidity, anode humidification temperature of 90° C. and cathode humidification temperature of 80° C. The result is shown in Table 1. The lower the polarization value, the smaller the decrease in electrode voltage, indicating excellent cell performance.

To determine the polarization value, V-I characteristic test (interrelation between voltage and current density) is generally used. The "polarization value" is an indication of energy loss (voltage lowering) caused when a current is derived from a cell. The polarization is classified into the resistance polarization (electrical or contact resistance attributed to materials) and the diffusion polarization (mass transfer resistance). The polarization value in the present invention is a total of these, and the smaller the polarization value, the smaller the energy loss and therefore the higher the cell performance.

Example 2

Preparation of Dispersion of Electrode Catalyst Fine Particles (2)

19 g of chloroplatinic hexahydrate (7 g in terms of Pt) and 5 g of ruthenium chloride (2 g in terms of Ru) were dissolved in 1600 g of pure water to form an aqueous metal salt mixture solution. The solution was then combined with 1660 g of a 1.0 wt % trisodium citrate aqueous solution as complexing stabilizer and 140 g of a 0.1 wt % sodium borohydride aqueous solution as reducing agent. The mixture was stirred at 20° C. for 1 hour in a nitrogen atmosphere to give a dispersion of fine metal particles. Subsequently, the dispersion was purified by ultrafiltration membrane method and the filtrate was concentrated to prepare a dispersion of fine platinum-ruthenium (alloy) particles having 1 wt % metal concentration. The dispersion pH was 6, the platinum/ruthenium weight ratio was 79/21, the average particle diameter was 4 nm, and the flow potential was −140 mV.

Separately, 5 g of carbon black powder (trade name: Ketjen black EC, specific surface area: 800 $m^2$/g, average particle diameter: 400 nm) was added to 495 g of pure water and mixed together by stirring. The resultant mixture was adjusted to pH 8 by addition of 1 wt % concentration hydrochloric acid. The thus-obtained carbon black dispersion had a flow potential of 900 mV.

The above-prepared carbon black dispersion was combined with 1000 g of the fine platinum-ruthenium alloy particle dispersion (5 g in terms of metals), and the pH of the dispersion mixture was adjusted to 6. In a nitrogen atmosphere, the dispersion mixture was stirred for 1 hour at 20° C. and thereby the platinum-ruthenium alloy fine particles were supported on the carbon black particles. As a result, a dispersion of electrode catalyst fine particles was obtained. The dispersion was subjected to centrifugal separation to recover the particles. The separated particles were then dispersed in pure water, and the pH was adjusted to 6, thus obtaining a dispersion of electrode catalyst fine particles (2) having 10 wt % solid concentration.

The electrode catalyst fine particles (2) were found to contain 48 wt % platinum and ruthenium. The average (secondary) particle diameter of the electrode catalyst fine particles (2) was 270 nm. When the dispersion was diluted to 1 wt % solid concentration, the flow potential was shown to be −380 mV.

Preparation of Single Cell Fuel Cell (2)

A single cell fuel cell (2) was prepared by the procedures illustrated in Example 1, except that 100 g of the 10 wt % dispersion of the electrode catalyst fine particles (2) was used.

Evaluation

The single cell fuel cell (2) was tested as described in Example 1 to determine the polarization value. The result is shown in Table 1.

Example 3

Preparation of Dispersion of Electrode Catalyst Fine Particles (3)

19 g of chloroplatinic hexahydrate (7 g in terms of Pt) and 7 g of ruthenium chloride (3 g in terms of Ru) were dissolved in 1600 g of pure water to form an aqueous metal salt mixture solution. The solution was then combined with 1660 g of a 1.0 wt % trisodium citrate aqueous solution as complexing stabilizer and 140 g of a 0.1 wt % sodium borohydride aqueous solution as reducing agent. The mixture was stirred at 20° C. for 1 hour in a nitrogen atmosphere to give a dispersion of fine metal particles. Subsequently, the dispersion was purified by ultrafiltration membrane method and the filtrate was concentrated to prepare a dispersion of fine platinum-ruthenium alloy particles having 1 wt % metal concentration. The dispersion pH was 6, the platinum/ruthenium weight ratio was 66/34, the average particle diameter was 4 nm, and the flow potential was −160 mV.

Separately, 5 g of carbon black powder (trade name: Ketjen black EC, specific surface area: 800 $m^2$/g, average particle diameter: 400 nm) was added to 495 g of pure water and mixed together by stirring. The resultant mixture was adjusted to pH 8 by addition of 1 wt % concentration hydrochloric acid. The thus-obtained carbon black dispersion had a flow potential of 900 mV.

The above-prepared carbon black dispersion was combined with 1000 g of the fine platinum-ruthenium alloy particle dispersion (5 g in terms of metals), and the pH of the dispersion mixture was adjusted to 6. In a nitrogen atmosphere, the dispersion mixture was stirred for 1 hour at 20° C. and thereby the platinum-ruthenium alloy fine particles were supported on the carbon black particles. As a result, a dispersion of electrode catalyst fine particles was obtained. The dispersion was subjected to centrifugal separation to recover the particles. The separated particles were then dispersed in pure water, and the pH was adjusted to 6, thus obtaining a dispersion of electrode catalyst fine particles (3) having 10 wt % solid concentration.

The electrode catalyst fine particles (3) were found to contain 46 wt % platinum and ruthenium. The average (secondary) particle diameter of the electrode catalyst fine particles (3) was 280 nm. When the dispersion was diluted to 1 wt % solid concentration, the flow potential was shown to be −360 mV.

Preparation of Single Cell Fuel Cell (3)

A single cell fuel cell (3) was prepared by the procedures illustrated in Example 1, except that 100 g of the 10 wt % dispersion of the electrode catalyst fine particles (3) was used.

Evaluation

The single cell fuel cell (3) was tested as described in Example 1 to determine the polarization value. The result is shown in Table 1.

Example 4

Preparation of Dispersion of Electrode Catalyst Fine Particles (4)

11 g of chloroplatinic hexahydrate (4 g in terms of Pt) and 12.5 g of ruthenium chloride (5 g in terms of Ru) were dissolved in 1600 g of pure water to form an aqueous metal salt mixture solution. The solution was then combined with 1660 g of a 1.0 wt % trisodium citrate aqueous solution as complexing stabilizer and 140 g of a 0.1 wt % sodium borohydride aqueous solution as reducing agent. The mixture was stirred at 20° C. for 1 hour in a nitrogen atmosphere to give a dispersion of fine metal particles. Subsequently, the dispersion was purified by ultrafiltration membrane method and the filtrate was concentrated to prepare a dispersion of fine platinum-ruthenium alloy particles having 1 wt % metal concentration. The dispersion pH was 6, the platinum/ruthenium weight ratio was 49/51, the average particle diameter was 4 nm, and the flow potential was −180 mV.

Separately, 5 g of carbon black powder (trade name: Ketjen black EC, specific surface area: 800 m$^2$/g, average particle diameter: 400 nm) was added to 495 g of pure water and mixed together by stirring. The resultant mixture was adjusted to pH 8 by addition of 1 wt % concentration hydrochloric acid. The thus-obtained carbon black dispersion had a flow potential of 900 mV.

The above-prepared carbon black dispersion was combined with 1000 g of the fine platinum-ruthenium alloy particle dispersion (5 g in terms of metals), and the pH of the dispersion mixture was adjusted to 6. In a nitrogen atmosphere, the dispersion mixture was stirred for 1-hour at 20° C. and thereby the platinum-ruthenium alloy fine particles were supported on the carbon black particles. As a result, a dispersion of electrode catalyst fine particles was obtained. The dispersion was subjected to centrifugal separation to recover the particles. The separated particles were then dispersed in pure water, and the pH was adjusted to 6, thus obtaining a dispersion of electrode catalyst fine particles (4) having 10 wt % solid concentration.

The electrode catalyst fine particles (4) were found to contain 45 wt % platinum and ruthenium. The average (secondary) particle diameter of the electrode catalyst fine particles (4) was 300 nm. When the dispersion was diluted to 1 wt % solid concentration, the flow potential was shown to be −350 mV.

Preparation of Single Cell Fuel Cell (4)

A single cell fuel cell (4) was prepared by the procedures illustrated in Example 1, except that 100 g of the 10 wt % dispersion of the electrode catalyst fine particles (4) was used.

Evaluation

The single cell fuel cell (4) was tested as described in Example 1 to determine the polarization value. The result is shown in Table 1.

Example 5

Preparation of Dispersion of Electrode Catalyst Fine Particles (5)

A dispersion of platinum-ruthenium alloy fine particles having 1 wt % metal concentration was obtained in the same manner as in Example 3. The dispersion pH was 6, the platinum/ruthenium weight ratio was 66/34, the average particle diameter was 4 nm, and the flow potential was −160 mV.

Separately, 3 g of carbon black powder (trade name: Ketjen black EC600JD, specific surface area: 1270 m$^2$/g, average particle diameter: 300 nm (aggregated particle diameter)) was added to 495 g of pure water and mixed together by stirring. The resultant mixture was adjusted to pH 8 by addition of 1 wt % concentration hydrochloric acid. The thus-obtained carbon black dispersion had a flow potential of 700 mV.

The above-prepared carbon black dispersion was combined with 1000 g of the fine platinum-ruthenium alloy particle dispersion (5 g in terms of metals), and the pH of the dispersion mixture was adjusted to 6. In a nitrogen atmosphere, the dispersion mixture was stirred for 1 hour at 20° C. and thereby the platinum-ruthenium alloy fine particles were supported on the carbon black particles. As a result, a dispersion of electrode catalyst fine particles was obtained. The dispersion was subjected to centrifugal separation to recover the particles. The separated particles were then dispersed in pure water, and the pH was adjusted to 6, thus obtaining a dispersion of electrode catalyst fine particles (5) having 10 wt % solid concentration.

The electrode catalyst fine particles (5) were found to contain 60 wt % platinum and ruthenium. The average (secondary) particle diameter of the electrode catalyst fine particles (5) was 300 nm. When the dispersion was diluted to 1 wt % solid concentration, the flow potential was shown to be −450 mV.

Preparation of single cell fuel cell (5)

A single cell fuel cell (5) was prepared by the procedures illustrated in Example 1, except that 100 g of the 10 wt % dispersion of the electrode catalyst fine particles (5) was used.

Evaluation

The single cell fuel cell (5) was tested as described in Example 1 to determine the polarization value. The result is shown in Table 1.

Example 6

Preparation of Dispersion of Electrode Catalyst Fine Particles (6)

25 g of chloroplatinic hexahydrate (9 g in terms of Pt) was dissolved in 16000 g of pure water to form an aqueous metal salt solution. The solution was then combined with 830 g of a 1.0 wt % trisodium citrate aqueous solution as complexing stabilizer and 140 g of a 0.1 wt % sodium borohydride aqueous solution as reducing agent. The mixture was stirred at 20° C. for 1 hour in a nitrogen atmosphere to give a dispersion of fine metal particles. Subsequently, the dispersion was purified by ultrafiltration membrane method and the filtrate was concentrated to prepare a dispersion of fine platinum particles having 1 wt % metal concentration. The dispersion pH was 6, the average particle diameter was 10 nm, and the flow potential was −90 mV.

Separately, 5 g of carbon black powder (trade name: Ketjen black EC, specific surface area: 800 m$^2$/g, average particle diameter: 400 nm) was added to 495 g of pure water and mixed together by stirring. The resultant mixture was adjusted to pH 8 by addition of 1 wt % concentration hydrochloric acid. The thus-obtained carbon black dispersion had a flow potential of 900 mV.

The above-prepared carbon black dispersion was combined with 1000 g of the fine platinum particle dispersion (5 g in terms of platinum), and the pH of the dispersion mixture was adjusted to 6. In a nitrogen atmosphere, the dispersion mixture was stirred for 1 hour at 20° C. and thereby the fine platinum particles were supported on the carbon black particles. As a result, a dispersion of electrode catalyst fine particles was obtained. The dispersion was subjected to centrifugal separation to recover the particles. The separated particles were then dispersed in pure water, and the pH was adjusted to 6, thus obtaining a dispersion of electrode catalyst fine particles (6) having 10 wt % solid concentration.

The electrode catalyst fine particles (6) were found to contain 39 wt % platinum. The average (secondary) particle diameter of the electrode catalyst fine particles (6) was 320 nm. When the dispersion was diluted to 1 wt % solid concentration, the flow potential was shown to be −360 mV.

Preparation of Single Cell Fuel Cell (6)

A single cell fuel cell (6) was prepared by the procedures illustrated in Example 1, except that 100 g of the 10 wt % dispersion of the electrode catalyst fine particles (6) was used.

Evaluation

The single cell fuel cell (6) was tested as described in Example 1 to determine the polarization value. The result is shown in Table 1.

Example 7

Preparation of Dispersion of Electrode Catalyst Fine Particles (7)

A dispersion of fine platinum particles having 1 wt % metal concentration was obtained in the same manner as in Example 1. The dispersion pH was 6, the average particle diameter was 4 nm, and the flow potential was −130 mV.

Separately, 5 g of carbon black powder (trade name: Ketjen black EC, specific surface area: 800 m$^2$/g, average particle diameter: 400 nm) was added to 495 g of pure water and mixed together by stirring. The resultant mixture was adjusted to pH 4 by addition of 1 wt % concentration hydrochloric acid. The thus-obtained carbon black dispersion had a flow potential of 50 mV.

The above-prepared carbon black dispersion was combined with 1000 g of the fine platinum particle dispersion (5 g in terms of platinum), and the pH of the dispersion mixture was adjusted to 6. In a nitrogen atmosphere, the dispersion mixture was stirred for 1 hour at 20° C. and thereby the fine platinum particles were supported on the carbon black particles. As a result, a dispersion of electrode catalyst fine particles was obtained. The dispersion was subjected to centrifugal separation to recover the particles. The separated particles were then dispersed in pure water, and the pH was adjusted to 6, thus obtaining a dispersion of electrode catalyst fine particles (7) having 10 wt % solid concentration.

The electrode catalyst fine particles (7) were found to contain 24 wt % platinum. The average (secondary) particle diameter of the electrode catalyst fine particles (7) was 380 nm. When the dispersion was diluted to 1 wt % solid concentration, the flow potential was shown to be −220 mV.

Preparation of Single Cell Fuel Cell (7)

A single cell fuel cell (7) was prepared by the procedures illustrated in Example 1, except that 100 g of the 10 wt % dispersion of the electrode catalyst fine particles (7) was used.

Evaluation

The single cell fuel cell (7) was tested as described in Example 1 to determine the polarization value. The result is shown in Table 1.

Example 8

Preparation of Dispersion of Electrode Catalyst Fine Particles (8)

25 g of chloroplatinic hexahydrate (9 g in terms of Pt) was dissolved in 16000 g of pure water to form an aqueous metal salt solution. The solution was then combined with 1660 g of a 1.0 wt % trisodium citrate aqueous solution as complexing stabilizer and 140 g of a 0.1 wt % sodium borohydride aqueous solution as reducing agent. The mixture was stirred at 20° C. for 1 hour in a nitrogen atmosphere to give a dispersion of fine metal particles. Subsequently, the dispersion was adjusted to pH 3 by addition of a 1 wt % hydrochloric acid aqueous solution. The resultant mixture was stirred for 1 hour and purified by ultrafiltration membrane method. The filtrate was concentrated and the particles were dispersed by use of a nanomizer system to prepare a dispersion of fine platinum chain particles having 1 wt % metal concentration. The dispersion pH was 6, the average primary particle diameter was 4 nm, the average length was 20 nm, and the flow potential was −80 mV.

Separately, 5 g of carbon black powder (trade name: Ketjen black EC, specific surface area: 800 m$^2$/g, average particle diameter: 400 nm) was added to 495 g of pure water and mixed together by stirring. The resultant mixture was adjusted to pH 8 by addition of 1 wt % concentration hydrochloric acid. The thus-obtained carbon black dispersion had a flow potential of 900 mV.

The above-prepared carbon black dispersion was combined with 1000 g of the fine platinum chain particle dispersion (5 g in terms of platinum), and the pH of the dispersion mixture was adjusted to 6. In a nitrogen atmosphere, the dispersion mixture was stirred for 1 hour at 20° C. and thereby the fine platinum chain particles were supported on the carbon black particles. As a result, a dispersion of electrode catalyst fine particles was obtained. The dispersion was subjected to centrifugal separation to recover the particles. The separated particles were then dispersed in pure water, and the pH was adjusted to 6, thus obtaining a dispersion of electrode catalyst fine particles (8) having 10 wt % solid concentration.

The electrode catalyst fine particles (8) were found to contain 30 wt % platinum. The average (secondary) particle diameter of the electrode catalyst fine particles (8) was 310 nm. When the dispersion was diluted to 1 wt % solid concentration, the flow potential was shown to be −260 mV.

Preparation of Single Cell Fuel Cell (8)

A single cell fuel cell (8) was prepared by the procedures illustrated in Example 1, except that 100 g of the 10 wt % dispersion of the electrode catalyst fine particles (8) was used.

Evaluation

The single cell fuel cell (8) was tested as described in Example 1 to determine the polarization value. The result is shown in Table 1.

Example 9

Preparation of Dispersion of Electrode Catalyst Fine Particles (9)

19 g of chloroplatinic hexahydrate (7 g in terms of Pt) and 7 g of ruthenium chloride (3 g in terms of Ru) were dissolved in 1600 g of pure water to form an aqueous metal salt mixture solution. The solution was then combined with 1660 g of a 1.0 wt % trisodium citrate aqueous solution as complexing stabilizer and 140 g of a 0.1 wt % sodium borohydride aqueous solution as reducing agent. The mixture was stirred at 20° C. for 1 hour in a nitrogen atmosphere to give a dispersion of fine metal particles. Subsequently, the dispersion was adjusted to pH 3 by addition of a 1 wt % hydrochloric acid aqueous solution. The resultant mixture was stirred for 1 hour and purified by ultrafiltration membrane method. The filtrate was concentrated and the particles were dispersed by use of a nanomizer system to prepare a dispersion of chain platinum-ruthenium alloy particles having 1 wt % metal concentration. The dispersion pH was 6, the platinum/ruthenium weight ratio was 66/34, the average primary particle diameter was 4 nm, the average length was 25 nm, and the flow potential was −160 mV.

Separately, 5 g of carbon black powder (trade name: Ketjen black EC, specific surface area: 800 m²/g, average particle diameter: 400 nm) was added to 495 g of pure water and mixed together by stirring. The resultant mixture was adjusted to pH 8 by addition of 1 wt % concentration hydrochloric acid. The thus-obtained carbon black dispersion had a flow potential of 900 mV.

The above-prepared carbon black dispersion was combined with 1000 g of the chain platinum-ruthenium alloy particle dispersion (5 g in terms of metals), and the pH of the dispersion mixture was adjusted to 6. In a nitrogen atmosphere, the dispersion mixture was stirred for 1 hour at 20° C. and thereby the chain platinum-ruthenium alloy fine particles were supported on the carbon black particles. As a result, a dispersion of electrode catalyst fine particles was obtained. The dispersion was subjected to centrifugal separation to recover the particles. The separated particles were then dispersed in pure water, and the pH was adjusted to 6, thus obtaining a dispersion of electrode catalyst fine particles (9) having 10 wt % solid concentration.

The electrode catalyst fine particles (9) were found to contain 24 wt % platinum and ruthenium. The average (secondary) particle diameter of the electrode catalyst fine particles (9) was 330 nm. When the dispersion was diluted to 1 wt % solid concentration, the flow potential was shown to be −210 mV.

Preparation of Single Cell Fuel Cell (9)

A single cell fuel cell (9) was prepared by the procedures illustrated in Example 1, except that 100 g of the 10 wt % dispersion of the electrode catalyst fine particles (9) was used.

Evaluation

The single cell fuel cell (9) was tested as described in Example 1 to determine the polarization value. The result is shown in Table 1.

Comparative Example 1

Preparation of Dispersion of Electrode Catalyst Fine Particles (R1)

A dispersion of fine platinum particles having 1 wt % metal concentration was obtained in the same manner as in Example 1. The dispersion pH was 6, the average particle diameter was 4 nm, and the flow potential was −130 mV.

Separately, 5 g of carbon black powder (trade name: Ketjen black EC, specific surface area: 800 m²/g, average particle diameter: 400 nm) was added to 495 g of pure water and mixed together by stirring. The resultant mixture was combined with 100 g of 1 wt % concentration polyvinylpyrrolidone as dispersing agent to give a carbon black dispersion. The dispersion had a flow potential of −130 mV.

The above-prepared carbon black dispersion was combined with 1000 g of the fine platinum particle dispersion (5 g in terms of platinum), and the pH of the dispersion mixture was adjusted to 6. In a nitrogen atmosphere, the dispersion mixture was stirred for 1 hour at 20° C. and thereby the fine platinum particles were supported on the carbon black particles. As a result, a dispersion of electrode catalyst fine particles was obtained. The dispersion was subjected to centrifugal separation to recover the particles. The separated particles were then dispersed in pure water, and the pH was adjusted to 6, thus obtaining a dispersion of electrode catalyst fine particles (R1) having 10 wt % solid concentration.

The electrode catalyst fine particles (R1) were found to contain 1 wt % platinum. The average (secondary) particle diameter of the electrode catalyst fine particles (R1) was 300 nm. When the dispersion was diluted to 1 wt % solid concentration, the flow potential was shown to be −10 mV.

Preparation of Single Cell Fuel Cell (R1)

A single cell fuel cell (R1) was prepared by the procedures illustrated in Example 1, except that 100 g of the 10 wt % dispersion of the electrode catalyst fine particles (R1) was used.

Evaluation

The single cell fuel cell (R1) was tested as described in Example 1 to determine the polarization value. The result is shown in Table 1.

Comparative Example 2

Preparation of Dispersion of Electrode Catalyst Fine Particles (R2)

A dispersion of platinum-ruthenium alloy fine particles having 1 wt % metal concentration was obtained in the same manner as in Example 3. The dispersion pH was 6, the platinum/ruthenium weight ratio was 67/33, the average particle diameter was 4 nm, and the flow potential was −160 mV.

Separately, 5 g of carbon black powder (average particle diameter: 50 μm) was added to 495 g of pure water and mixed together by stirring. The resultant mixture was adjusted to pH 8 by addition of 1 wt % concentration hydrochloric acid. The thus-obtained carbon black dispersion had a flow potential of 0 mV.

The above-prepared carbon black dispersion was combined with 1000 g of the fine platinum-ruthenium alloy particle dispersion (5 g in terms of metals), and the pH of the dispersion mixture was adjusted to 6. In a nitrogen atmosphere, the dispersion mixture was stirred for 1 hour at 20° C. and thereby the platinum-ruthenium alloy fine particles were supported on the carbon black particles. As a result, a dispersion of electrode catalyst fine particles was obtained. The dispersion was subjected to centrifugal separation to recover the particles. The separated particles were then dispersed in pure water, and the pH was adjusted to 6, thus obtaining a dispersion of electrode catalyst fine particles (R2) having 0.10 wt % solid concentration.

The electrode catalyst fine particles (R2) were found to contain 2 wt % platinum and ruthenium. The average (secondary) particle diameter of the electrode catalyst fine particles (R2) was 50 μm or above. Since the particles had such large diameters, they were sedimented shortly, that is, the dispersion was not stable. When the dispersion was diluted to 1 wt % solid concentration, the flow potential was shown to be 0 mV.

Preparation of Single Cell Fuel Cell (R2)

A single cell fuel cell (R2) was-prepared by the procedures illustrated in Example 1, except that 100 g of the 10 wt % dispersion of the electrode catalyst fine particles (R2) was used.

Evaluation

The single cell fuel cell (R2) was tested as described in Example 1 to determine the polarization value. The result is shown in Table 1.

Comparative Example 3

Preparation of Dispersion of Electrode Catalyst Fine Particles (R3)

5 g of carbon black powder (trade name: Ketjen black EC) was added to 495 g of pure water and mixed together by stirring. The resultant mixture was adjusted to pH 8 by addition of 1 wt % hydrochloric acid aqueous solution, and thereafter combined with 300 g of a diammine platinum nitric acid solution having 5 wt % platinum concentration. The pH was then adjusted to 9 by addition of a 1 wt % sodium hydroxide aqueous solution, and stirring was performed at 90° C. for 1 hour to precipitate platinum hydroxide on the carbon black particles. Subsequently, 100 g of a 1.0 wt % formic acid aqueous solution was added, and the mixture was stirred at 50° C. for 2 hours to perform reduction. The thus-obtained dispersion was filtered, and the particles were washed and dried at 60° C. to yield platinum-supporting carbon black particles. The particles were found to contain 60 wt % platinum.

Thereafter, 3 g of the platinum-supporting particles were dispersed in 200 g of a ruthenium chloride aqueous solution having 5.0 wt % ruthenium concentration (10 g in terms of Ru) Subsequently, 100 g of a 1.0 wt % formic acid aqueous solution was added, and the mixture was stirred at 50° C. for 4 hours. The thus-obtained dispersion was filtered, and the particles were washed, dried at 60° C. and reduced by being treated in a hydrogen gas diluted with a nitrogen gas (2% by volume hydrogen concentration) at 500° C. over a period of 4 hours. Thus, electrode catalyst fine particles (R3) were prepared.

The electrode catalyst fine particles (R3) were found to contain 40 wt % platinum and ruthenium. The platinum/ruthenium weight ratio was 67/33. The average particle diameter of the platinum-ruthenium alloy fine particles was 30 nm.

Subsequently, the electrode catalyst fine particles (R3) were dispersed in pure water, and the dispersion was adjusted to pH 6 by addition of a 1 wt % hydrochloric acid aqueous solution, thereby obtaining a dispersion of the electrode catalyst fine particles (R3) having 10 wt % solid concentration. The average (secondary) particle diameter of the electrode catalyst fine particles (R3) was 3000 nm.

When the dispersion was diluted to 1 wt % solid concentration, the flow potential was shown to be 80 mV.

Preparation of Single Cell Fuel Cell (R3)

A single cell fuel cell (R3) was prepared by the procedures illustrated in Example 1, except that 100 g of the 10 wt % dispersion of the electrode catalyst fine particles (R3) was used.

Evaluation

The single cell fuel cell (R3) was tested as described in Example 1 to determine the polarization value. The result is shown in Table 1.

TABLE 1

| | Electrode catalyst fine particles Fine metal particles | | | | | | | |
|---|---|---|---|---|---|---|---|---|
| | Composition | | | Average particle | Average length | Primary particle diameter or | | Flow potential (1) |
| | Pt | Ru | Configuration | diameter (nm) | (nm) | section (nm) | pH | (mV) |
| Ex. 1 | 100 | — | Monodisperse | 4 | — | — | 6 | −130 |
| Ex. 2 | 79 | 21 | Monodisperse | 4 | — | — | 6 | −140 |
| Ex. 3 | 66 | 34 | Monodisperse | 4 | — | — | 6 | −160 |
| Ex. 4 | 49 | 51 | Monodisperse | 4 | — | — | 6 | −180 |
| Ex. 5 | 66 | 34 | Monodisperse | 4 | — | — | 6 | −160 |
| Ex. 6 | 100 | — | Monodisperse | 10 | — | — | 6 | −90 |
| Ex. 7 | 100 | — | Monodisperse | 4 | — | — | 6 | −130 |
| Ex. 8 | 100 | — | Chain | 4* | 20 | 4 | 6 | −80 |
| Ex. 9 | 66 | 34 | Chain | 5* | 25 | 5 | 6 | −100 |
| Comp. Ex. 1 | 100 | — | Monodisperse | 4 | — | — | 6 | −130 |
| Comp. Ex. 2 | 66 | 34 | Monodisperse | 4 | — | — | 6 | −130 |
| Comp. Ex. 3 | 66 | 34 | Monodisperse | 30 | — | — | — | — |

*Primary particle diameter

| | Electrode catalyst fine particles Carrier particles | | | |
|---|---|---|---|---|
| | Composition | Specific surface area ($m^2/g$) | Average (secondary) particle diameter (nm) | pH | Flow potential (2) (mV) |
| Ex. 1 | Carbon | 800 | 400 | 8 | 900 |
| Ex. 2 | Carbon | 800 | 400 | 8 | 900 |
| Ex. 3 | Carbon | 800 | 400 | 8 | 900 |
| Ex. 4 | Carbon | 800 | 400 | 8 | 900 |
| Ex. 5 | Carbon | 1270 | 300 | 8 | 700 |
| Ex. 6 | Carbon | 800 | 400 | 8 | 900 |
| Ex. 7 | Carbon | 800 | 400 | 8 | 50 |
| Ex. 8 | Carbon | 800 | 400 | 8 | 900 |
| Ex. 9 | Carbon | 800 | 400 | 8 | 900 |
| Comp. Ex. 1 | Carbon | 800 | 400 | 8 | −130 |

TABLE 1-continued

| | | Amount of fine metal particles supported (wt %) | Flow potential difference (2) − (1) (mV) | Average particle diameter (nm) | Dispersion of electrode catalyst fine particles | | | Single cell fuel cell Polarization value 80° C. (mV) |
|---|---|---|---|---|---|---|---|---|
| Comp. Ex. 2 | Carbon | — | | 50 μm | 8 | | 0 | |
| Comp. Ex. 3 | Carbon | 800 | | 400 | 8 | | 900 | |

| | Electrode catalyst fine particles | | | | | | |
|---|---|---|---|---|---|---|---|
| | Amount of fine metal particles supported (wt %) | Flow potential difference (2) − (1) (mV) | Average particle diameter (nm) | Dispersion of electrode catalyst fine particles | | Flow potential (mV) | Single cell fuel cell Polarization value 80° C. (mV) |
| | | | | Concentration (wt %) | pH | | |
| Ex. 1 | 50 | 1030 | 250 | 10 | 6 | −400 | 73 |
| Ex. 2 | 48 | 1040 | 270 | 10 | 6 | −380 | 57 |
| Ex. 3 | 46 | 1060 | 280 | 10 | 6 | −360 | 52 |
| Ex. 4 | 45 | 1080 | 300 | 10 | 6 | −350 | 54 |
| Ex. 5 | 60 | 860 | 300 | 10 | 6 | −450 | 31 |
| Ex. 6 | 39 | 990 | 320 | 10 | 6 | −360 | 88 |
| Ex. 7 | 24 | 180 | 380 | 10 | 6 | −220 | 96 |
| Ex. 8 | 30 | 980 | 310 | 10 | 6 | −260 | 64 |
| Ex. 9 | 28 | 1000 | 330 | 10 | 6 | −210 | 27 |
| Comp. Ex. 1 | 1 | 0 | 300 | 10 | 6 | −10 | 420 |
| Comp. Ex. 2 | 2 | 0 | Sedimented* | 10 | 6 | −130 | 580 |
| Comp. Ex. 3 | 40 | — | 3000 | 10 | 6 | 80 | 143 |

*Sedimented due to 50 μm or more average (secondary) particle diameter

What is claimed is:

1. Electrode catalyst fine particles comprising fine metal particles consisting essentially of one or more metals selected from the group consisting of Au, Ag, Pd, Pt, Rh, Cu, Fe, Ni, Co, Sn, Ti, In, Al, Ta, Sb, Rn, Mo and Cr and having an average particle diameter of 2 to 200 nm supported on carrier particles having an average particle diameter of 10 nm to 10 μm, wherein a potential difference (absolute value of (II) minus (I)) between a flow potential (I) of a water dispersion of the fine metal particles at 1 wt % concentration and a pH of 3 to 8 and a flow potential (II) of a water dispersion of the carrier particles at 1 wt % concentration and a pH of 4 to 10, is in the range of 10 to 3000 mV, and wherein the electrode catalyst fine particle is obtained by mixing a dispersion of the fine metal particles and a dispersion of the carrier particles, and then adjusting the pH of the dispersion mixture in the range of 2 to 10.

2. The electrode catalyst fine particles according to claim 1, wherein the fine metal particles have an average particle diameter of 2 to 100 nm.

3. A dispersion of electrode catalyst fine particles, comprising the electrode catalyst fine particles of claim 2 and a dispersion medium in which the particles are dispersed.

4. The electrode catalyst fine particles according to claim 1, wherein the fine metal particles comprise fine metal chain particles resulting from chainwise linkage of two or more primary particles having an average primary particle diameter of 2 to 50 nm.

5. A dispersion of electrode catalyst fine particles, comprising the electrode catalyst fine particles of claim 4 and a dispersion medium in which the particles are dispersed.

6. A dispersion of electrode catalyst fine particles, comprising the electrode catalyst fine particles of claim 1 and a dispersion medium in which the particles are dispersed.

7. The dispersion of electrode catalyst fine particles according to claim 6, wherein the electrode catalyst fine particles is dispersed in water at 1 wt % solid concentration and a pH of 1 to 10 to provide a flow potential of −800 to −50 mV.

8. A process for producing a dispersion of electrode catalyst fine particles, which process comprises mixing a dispersion of fine metal particles consisting essentially of one or more metals selected from the group consisting of Au, Ag, Pd, Pt, Rh, Cu, Fe, Ni, Co, Sn, Ti, In, Al, Ta, Sb, Ru, Mo and Cr and having an average particle diameter of 2 to 200 nm and a dispersion of carrier particles having an average particle diameter of 10 nm to 10 μm, the fine metal particles being dispersed in water at 1 wt % concentration and a pH of 3 to 8 to have a flow potential (I) and the carrier particles being dispersed in water at 1 wt % concentration and a pH of 4 to 10 to have a flow potential (II) such that the potential difference (absolute value of (II) minus (I)) between the flow potentials (I) and (II) is in the range of 10 to 3000 mV, and adjusting the pH of the dispersion mixture in the range of 2 to 10.

* * * * *

UNITED STATES PATENT AND TRADEMARK OFFICE
CERTIFICATE OF CORRECTION

| | |
|---|---|
| PATENT NO. | : 7,479,469 B2 |
| APPLICATION NO. | : 10/966895 |
| DATED | : January 20, 2009 |
| INVENTOR(S) | : Ishihara et al. |

Page 1 of 1

It is certified that error appears in the above-identified patent and that said Letters Patent is hereby corrected as shown below:

Column 21, Line 34, Claim 1, "Rn" should read -- Ru --

Signed and Sealed this

Twenty-sixth Day of May, 2009

JOHN DOLL
*Acting Director of the United States Patent and Trademark Office*